BURDICK & READ.
Corn Harvester.
No. 35,921.
Patented July 22, 1862.
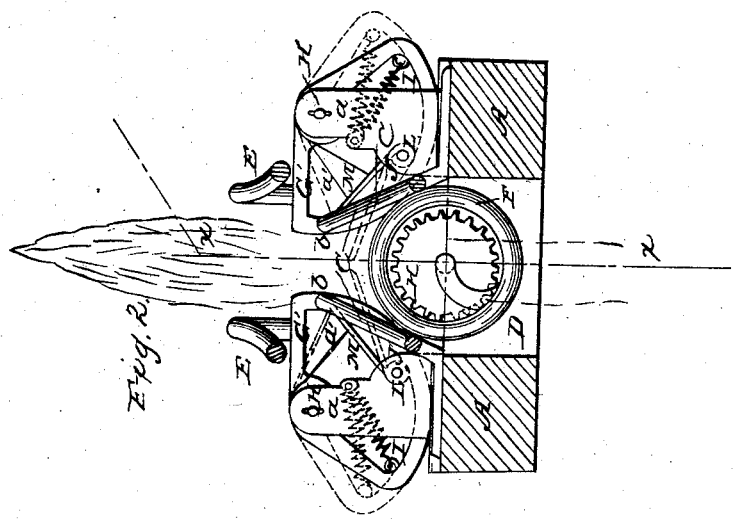
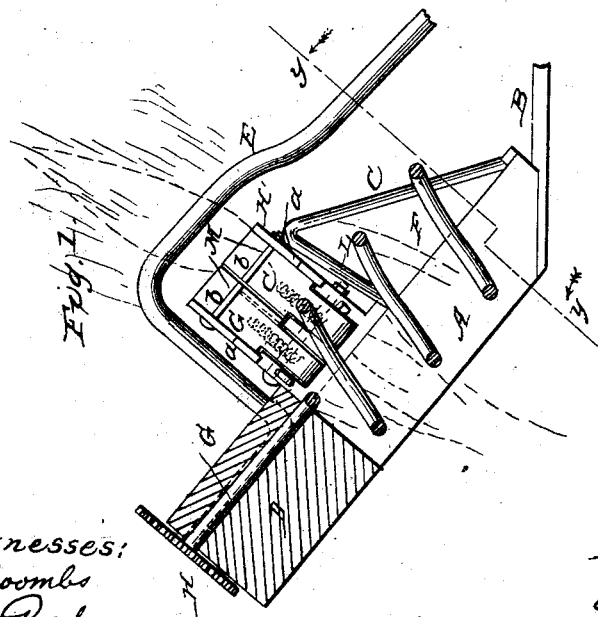

UNITED STATES PATENT OFFICE.

A. R. BURDICK, OF RACINE, WIS., AND C. D. READ, OF ELGIN, ILL.

IMPROVEMENT IN CORN-HARVESTERS.

Specification forming part of Letters Patent No. 35,921, dated July 22, 1862.

*To all whom it may concern:*

Be it known that we, A. R. BURDICK, of Racine, in the county of Racine and State of Wisconsin, and C. D. READ, of Elgin, in the county of Kane and State of Illinois, have invented a new and Improved Machine for Picking and Husking Corn; and we do hereby declare that the following is a full, clear, and exact description of the same, reference being had to the accompanying drawings, making a part of this specification, in which—

Figure 1 is a side sectional view of our invention, taken in the line $x$ $x$, Fig. 2. Fig. 2 is a front sectional view of the same, taken in the line $y$ $y$, Fig. 1.

Similar letters of reference indicate corresponding parts in the two figures.

The object of this invention is to obtain a machine by which corn may be picked from the standing stalks and husked at the same operation.

To this end the invention consists in the employment or use of a screw in connection with cutters and yielding segments applied to a guide-frame, all being arranged in such a manner as to be capable of being attached to a mounted frame or wagon, and perform the desired work as the latter is drawn along in the field in proper relation with the rows of corn.

To enable those skilled in the art to fully understand and construct our invention, we will proceed to describe it.

A A represent two parallel bars, each of which has a rod or bar, B, attached angularly to its front end, and a guide-frame, C, attached to its upper part. The frames C may be composed of a single rod, bent as shown in Fig. 1, and attached to the bars A A, so as to incline toward each other at their upper ends above the bars A A, as shown in Fig. 2. The back parts of the bars A A are connected to or form a part of a block, D, and to this block two bent rods or bars, E E, are secured, which project forward and above the bars A A, and are somewhat diverging, as shown in Fig. 2.

F represents a screw, which is constructed of a rod bent so as to form a screw, as shown clearly in both figures. This screw has a shaft, G, at its back end, which passes through the block D, and has a gear-wheel, H, on its back end, as shown in Fig. 1. The screw F is placed in the space between the parallel bars A A, and each bar has two uprights, $a$ $a$, secured to it, between which the segments G' G' are placed, and hung loosely on rods H', so that they may work freely thereon. Each segment has a spiral spring, I, attached to it, and these springs have a tendency to keep the segments I in an upward working position, ready to receive the ears of corn between them. Stops J, which consist of set-screws fitted in the uprights $a$ $a$, determine the extent of the downward movement of the segments.

In the lower parts of the uprights $a$ $a$, on each bar A, there is fitted a rod, L, on which cutters M are placed, the lower ends of the cutters being bent or curved, so that they may turn freely thereon. These cutters are fitted in or pass through slots $b$ in the segments. A space is allowed between the inner sides of the segments, as shown in Fig. 2, and this space may be varied in width by adjusting the stops or screws J.

The operation is as follows: The device is attached to the side of a wagon or mounted frame, and in an inclined position at an angle of about forty or forty-five degrees. (See Fig. 1. The animal walks between the rows of corn, while the bars A A are at each side of the row at one side of the machine. The screw F is rotated by means of any suitable gearing from one of the wheels of the machine. The bars A A B B, frames C C, and bars E E gather the corn, straightening it up, and in connection with the rotary screw F bringing it in a proper upright position in the space between the bars A A. The stalks of corn as they enter or pass between the segments G' G' bind therein, owing to the size of the ears, and as said segments are inclined and the stalks are firmly held in the ground by their roots, said segments will be drawn downward under the forward movement of the machine, and this downward movement of the segments causes the cutters M to be forced outward through the slots $b$ of the segments, and the ears will be detached from the standing stalks, and the husks stripped from them. This operation will be fully understood by referring to the drawings, especially Fig. 3, in which the operation of the segments and cutters on the cone is shown in red outline. The portions of the stalks free from ears will not be cut, as they cannot bind or wedge between the segments; hence the cutters can operate on the ears, which bind in or between the segments, and cause their depression or movement downward. As soon as the cutters are relieved from one stalk of corn, they are forced back to their original position by the springs I, ready for a succeeding operation; and, in order to suit the varying height of the ears on the stalks, a series of segments and cutters may be used at different heights, one behind the other; and, in case it is desired to pick and husk two rows of corn at the same time a device, as described, may be attached to each side of the wagon or mounted frame.

The machine is extremely simple, and may be constructed and applied at a small cost. It will effect a great saving in labor. The stalks after being stripped are left standing on the field.

Having thus described our invention, what we claim as new, and desire to secure by Letters Patent, is—

1. The segments G' and cutters M, with or without the screw F, arranged to operate substantially as and for the purpose herein set forth.

2. In combination with the screw F, segments G', and cutters M, the bars A A B B, frames C C, and bars E E, all arranged for joint operation, as and for the purpose specified.

A. R. BURDICK.
C. D. READ.

Witnesses:
GEORGE MARSH,
H. G. WINSLOW,
JAMES S. TAYLOR,
M. J. DUNNE.